Y. OSE.
METHOD OF MANUFACTURING RUBBER SHOES.
APPLICATION FILED APR. 17, 1920.
1,430,677. Patented Oct. 3, 1922.
*Fig. 1,*
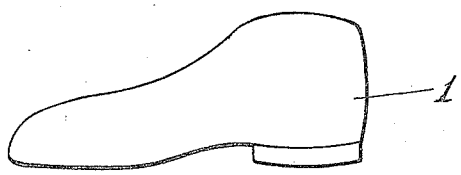
*Fig. 5.* *Fig. 2,*
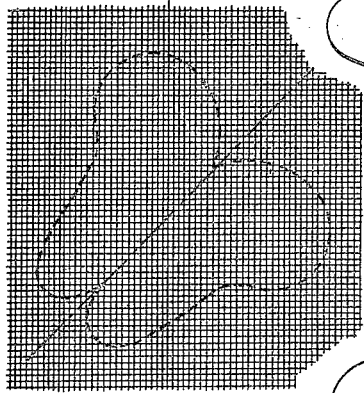 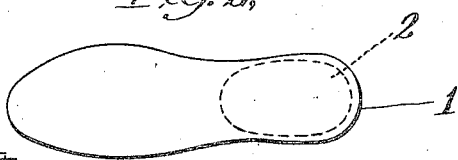
*Fig. 3,*
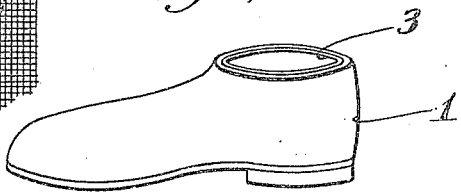
*Fig. 4,*
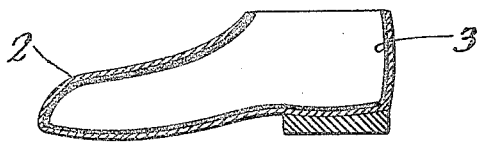
Inventor
Yosaku OSE
By his Attorney
H. W. Pencrot.

Patented Oct. 3, 1922.

1,430,677

UNITED STATES PATENT OFFICE.

YOSAKU OSE, OF TOKYO, JAPAN.

METHOD OF MANUFACTURING RUBBER SHOES.

Application filed April 17, 1920. Serial No. 374,598.

*To all whom it may concern:*

Be it known that I, YOSAKU OSE, engineer, a subject of the Emperor of Japan, residing at No. 1 Majima-cho, Shitayaku, city of Tokyo, Empire of Japan, have invented certain new Method of Manufacturing Rubber Shoes, of which the following is a specification.

This invention relates to improvements in the method of manufacturing rubber-shoes, and it consists in placing in a mould sealed shoe-shaped rubber and cloth bags, and producing from them a rubber shoe by utilizing the expansive force of ammonia.

The object of the invention is, in the manufacture of rubber shoes, to save time and labour in pasting and sewing separately the lining cloth, shoe-bottom and other parts, and further to economize in the materials employed.

In order that the invention may be clearly understood and readily carried into effect, it will now be described with reference to the accompanying drawings, in which:—

Fig. 1 is a side view of a rubber shoe constructed according to this invention after being taken from the mould.

Fig. 2 is a plan view of the same, the dotted line 2 showing the part to be subsequently cut out to provide the opening for the insertion of the foot of the wearer.

Fig. 3 is a perspective view of a completed rubber shoe.

Fig. 4 is a longitudinal section of the same, 2 denoting the elastic rubber and 3, the lining cloth.

Fig. 5 is a diagrammatic representation of a piece of cloth showing the position of a blank to be cut therefrom.

In carrying out this invention, a shoe-shaped bag is made of a suitable cloth which is cut (see Fig. 5) at an inclination of 45 degrees for the purpose of allowing extension of the cloth.

A suitable quantity of ammonia powder, that is to say, ammonium carbonate $(NH_4)_2CO_3$, is placed inside the bag which is then sealed and coated on its outer surface with gum arabic to make it gas-tight and for the purpose of obtaining intimate adhesion of the bag with the inner surface of a rubber bag in which it is subsequently enclosed. This rubber bag is made of an elastic rubber, is also shoe-shaped and of a somewhat larger size than the cloth bag. On its inside the rubber bag is coated with gum arabic so as to obtain intimate adhesion between it and the outer surface of cloth bag. The cloth bag is placed in the rubber bag, and after sealing the latter, both are placed in a metal mould which may have various patterns provided on its inner surface, for the purpose of producing slip-preventing indentations on the shoe bottom, and/or ornamental patterns on the surface of the shoe, or otherwise. Then a suitable drying process is applied, and the rubber and cloth bags are caused to closely adhere by the expansive force of the ammonia gas generated. The cutting at an angle or on the bias of the blank to form the cloth bag permits the said bag to stretch more readily than would be the case if the blank were cut with the threads of the cloth. Intimate contact between the cloth and rubber bags without fear of damage to the material of the former is therefore assured. The rubber shoe thus produced is illustrated in Fig. 1, and it is a hollow body totally enclosed by the rubber and cloth. When the top of the body is cut out along the dotted line 2 of Fig. 2, so as to produce the opening for the foot, a completed rubber shoe is produced as shown in Fig. 3 and of the section shown in Fig. 4.

As the rubber shoe made in accordance with the above process is produced wholly from a composite bag, it is much stronger than usual rubber shoes which are produced from several pieces of rubber and cloth sewed and pasted together. Further, in this process, the whole of shoe is produced simultaneously from the bottom to the surface patterns, saving much time and labour, and economizing in material, for even the cut out material may be utilized for other purposes. Lastly, the rubber shoes thus produced have a pleasing and commanding appearance.

I claim:

The process of manufacturing rubber shoes which consists in making a shoe-shaped bag of cloth cut at an inclination of 45 degrees for the purpose of allowing extension of the cloth, the bag being sealed up with ammonia powder inside it and coated on its outer surface with gum arabic, in inserting said cloth bag into a shoe-shaped elastic rubber bag of a somewhat larger size coated with gum arabic on its inner surface, in placing the sealed rubber and cloth bags in a metal mould, and subjecting them to a drying process, and finally, in cutting out a foot-insertion opening in the body thus produced.

In testimony whereof I affix my signature in presence of two witnesses.

YOSAKU OSE.

Witnesses:
T. C. SMITH,
W. O. GALLOWAY.